United States Patent [19]
Lee et al.

[11] Patent Number: 5,459,626
[45] Date of Patent: Oct. 17, 1995

[54] APPARATUS FOR DRIVING A DUAL DECK TYPE VIDEO RECORDER HAVING A SPECIFIC TAPE GUIDING CONFIGURATION

[75] Inventors: Unju Lee, Suwon; Jaigon Lee, Inchon; Bongjoo Kim, Suwon, all of Rep. of Korea

[73] Assignee: Samsung Electronics Co., Ltd., Kyungki-do, Rep. of Korea

[21] Appl. No.: 5,445

[22] Filed: Jan. 19, 1993

[30] Foreign Application Priority Data

Jan. 16, 1992 [KR] Rep. of Korea ............................ 92-589

[51] Int. Cl.⁶ .......................... G11B 15/61; G11B 15/665
[52] U.S. Cl. ................................................ 360/85; 360/95
[58] Field of Search ............................... 360/85, 95, 74.3

[56] References Cited

U.S. PATENT DOCUMENTS

| | | | |
|---|---|---|---|
| 4,556,922 | 12/1985 | Erhart | 360/85 |
| 4,796,115 | 1/1989 | Ohshima et al. | 360/95 |
| 5,166,843 | 11/1992 | Kuwajima | 360/95 |
| 5,291,351 | 3/1994 | Takita et al. | 360/85 |
| 5,305,162 | 4/1994 | Kushiro et al. | 360/85 |
| 5,315,460 | 5/1994 | Takeda et al. | 360/85 |
| 5,331,482 | 7/1994 | Takasaki et al. | 360/85 |
| 5,361,180 | 11/1994 | Yamabuchi et al. | 360/85 |

*Primary Examiner*—Robert S. Tupper
*Assistant Examiner*—Craig A. Renner
*Attorney, Agent, or Firm*—Sughrue, Mion, Zinn, Macpeak & Seas

[57] ABSTRACT

An apparatus for driving a deck of a camcorder and a control method thereof in which an inclined drum having forty millimeters diameter, which may be easily manufactured and is inexpensive, is forwardly mounted on a maid deck, and a guiding mechanism and various driving devices are designed in an effort to miniaturize the camcorder. According to the invention, there is provided an apparatus for driving a deck of a camcorder, the deck having a main deck and a sub-deck adapted to move on the main deck. The apparatus includes an inclined drum mounted on the main deck, upper guide rails provided on both sides of the drum, lower guide rails provided on both sides of the sub-deck in correspondence with the upper guide rails when the sub-deck is moved to a predetermined position, pole bases having a left pole base and a right pole base mounted on the sub-deck for loading a tape to the drum, each of the pole bases being moved along each loading slot which is formed at each of the upper and lower guide rails and a device for guiding the tape along a travelling path.

7 Claims, 8 Drawing Sheets

5,459,626

APPARATUS FOR DRIVING A DUAL DECK TYPE VIDEO RECORDER HAVING A SPECIFIC TAPE GUIDING CONFIGURATION

BACKGROUND OF THE INVENTION

The present invention relates to a camera integrated type video tape recorder (hereinafter, referred to as "camcorder"), and more particularly to an apparatus for driving a deck of the camcorder and a control method thereof.

Generally, camcorders are classified into two types: a single deck type and a double deck type. The single deck type camcorder includes a drum having a head for recording and reproducing signals on a tape, a loading mechanism for loading the tape around the drum, two reels for mounting the tape thereon, a driving device for driving the loading mechanism and the reels. However, since all the components including the above elements are arranged on the single deck to record and reproduce the signals on the tape, the deck is necessarily large thus inhibiting the portability of the camcorder.

On the other hand, in the double deck type camcorder consisting of a main deck and a sub-deck, all of the components which are required to record and reproduce the signals on the tape are separated disposed on the main deck and the sub-deck, so that the reduction of the deck size may be accomplished. However, since the drum is mounted at an inclined angle at a predetermined position of the main deck and the sub-deck is slidably provided on the main deck to facilitate loading of the tape, the height of the deck is increased to accommodate the angularly disposed drum. Further, when the sub-deck closely approaches the drum, there is a possibility that the tape case may come into contact with the drum. Therefore, there is the problem that the conventional deck must be relatively large in terms of height and length, so that the camcorder is increased in size.

SUMMARY OF THE INVENTION

It is an object of the present invention to provide an apparatus for driving a deck of a camcorder and a control method thereof in which an inclined drum having forty millimeters diameter, which may be easily manufactured and is inexpensive, is forwardly mounted on a main deck, and a guiding mechanism and various driving devices are designed in an effort to miniaturize the camcorder.

According to the present invention, there is provided an apparatus for driving a deck of a camcorder, the deck having a main deck and a sub-deck adapted to move on the main deck, comprising: an inclined drum mounted on the main deck; upper guide rails provided on both sides of the drum; lower guide rails provided on both sides of the sub-deck in correspondence with the upper guide rails when the sub-deck is moved to a predetermined position; pole bases having a left pole base and a right pole base mounted on the sub-deck for loading a tape to the drum, each of the pole bases being moved along each loading slot which is formed at each of the upper and lower guide rails; and a device for guiding the tape along a travelling path.

Further, there is provided a control method for controlling the operation of the deck of the camcorder. The method includes the following steps: an ejecting step for moving the sub-deck on a main deck in the backward direction to expose the housing of the camcorder to facilitate ejection of a tape; an unloading stop step for inserting the tape into the housing and for securing the housing to the sub-deck; an end sensing step for sensing a tape position to load the tape and for moving a pinch roller and a review arm together with the sub-deck; a sub-loading step for loading pole bases in a tape loading position; a playback step for operating the pole bases and pressing the pinch roller against a capstan shaft to play back data on the tape; and a standby step for terminating rotation of a take-up reel and a supply reel and for moving the pinch roller away from the capstan shaft to terminate the playback step.

BRIEF DESCRIPTION OF THE DRAWINGS

These and other objects, features, and advantages of the present invention will become more apparent from the following description of the preferred embodiment taken in conjunction with the accompanying drawings, in which:

FIGS. 6A to 6F are views illustrating the operating states of an apparatus according to the present invention wherein FIG. 6A is a schematical view of an idler, FIG. 6B is a schematical view of the sub-deck, FIG. 6C is a schematical view of a guide lever, a pinch roller and a review arm, FIG. 6D is a schematical view of pole bases, FIG. 6E is a schematical view of braking devices for respectively braking a supply reel and a take-up reel and FIG. 6F is a schematical view of a tension pole.

DETAILED DESCRIPTION OF THE PREFERRED EMBODIMENT

Now, the preferred embodiment according to the present invention will be explained in detail with reference to the accompanying drawings.

Figure 1:
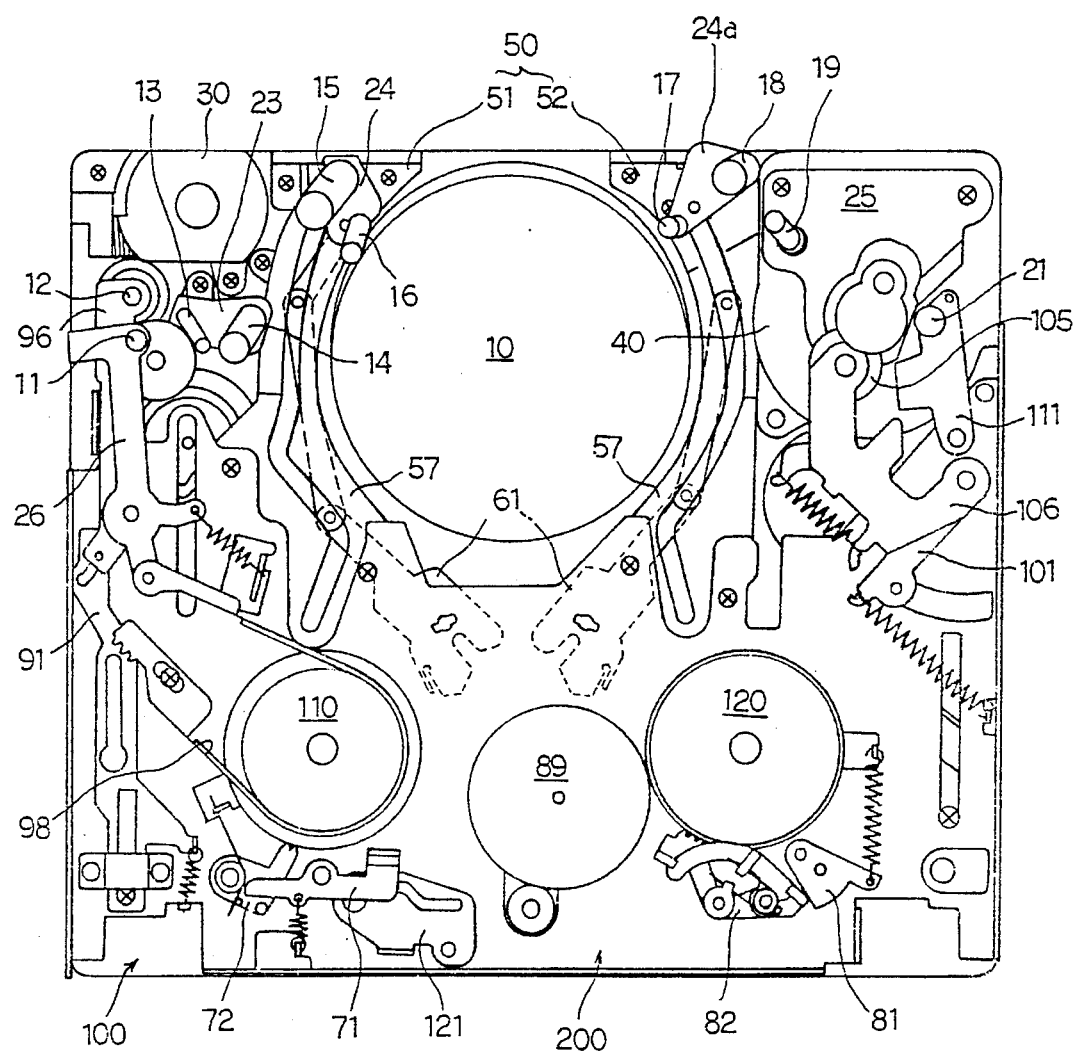
FIG. 1 is a plan view illustrating a deck of a camcorder according to the present invention.
Figure 2:
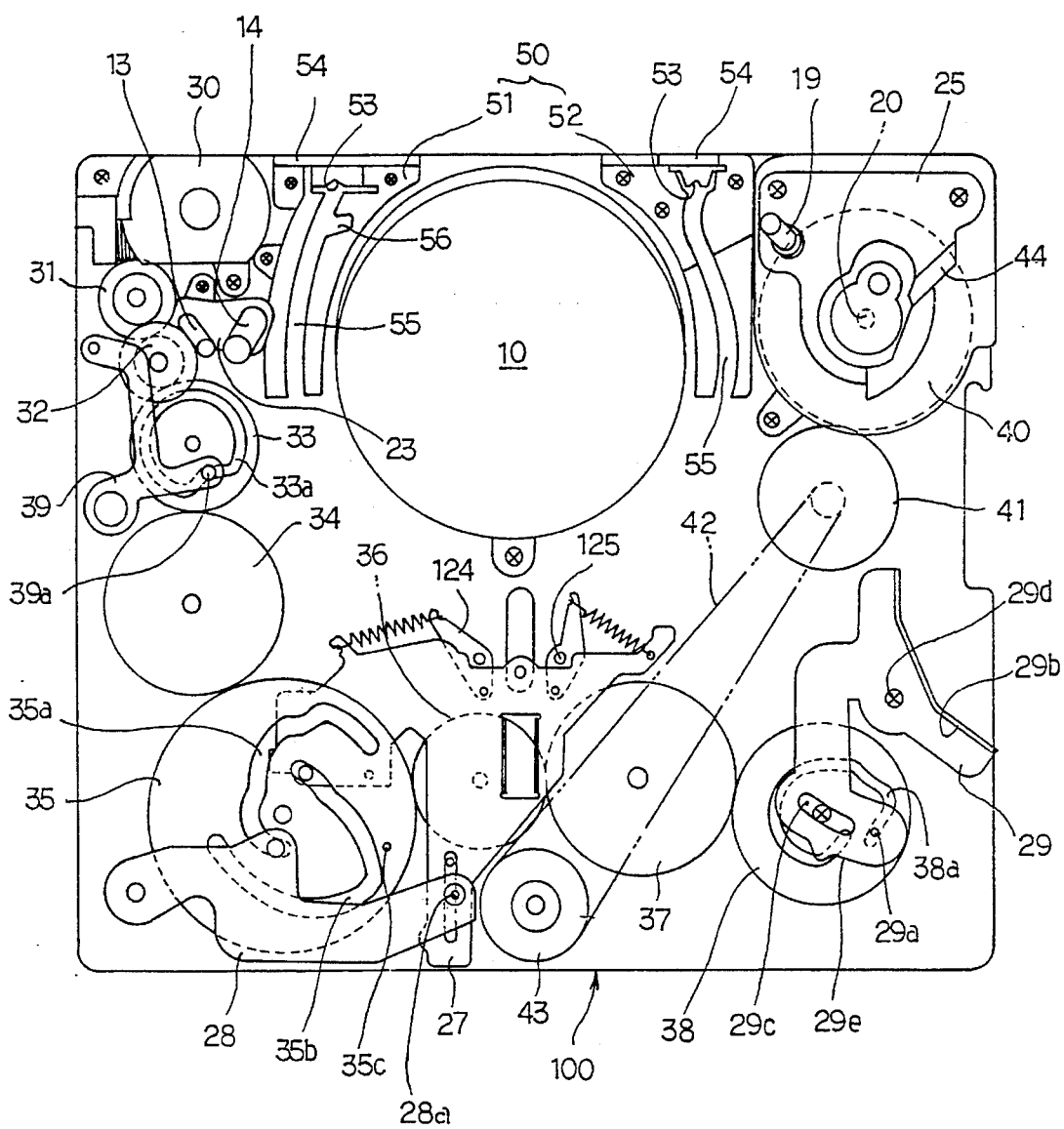
FIG. 2 is a plan view illustrating a main deck according to the present invention.
Figure 3:
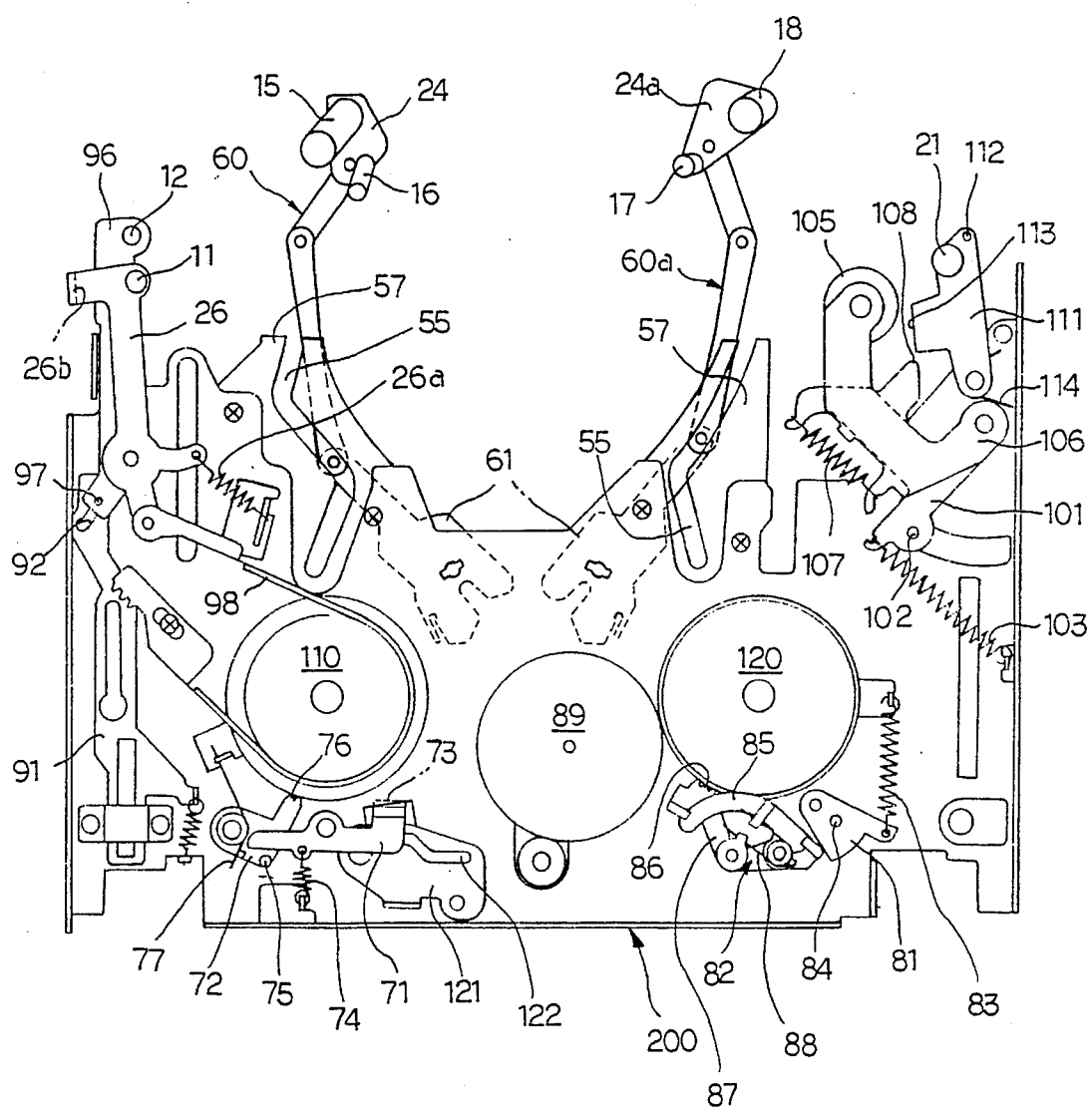
FIG. 3 is a plan view illustrating a sub-deck according to the present invention.

Referring to FIGS. 1–3, the camcorder of the present invention includes a sub-deck 200 which is movably provided on a main deck 100. Mounted on the forward end of the main deck 100 is an inclined drum 10 disposed at an angle of, for example, ten degrees.

Figure 5:
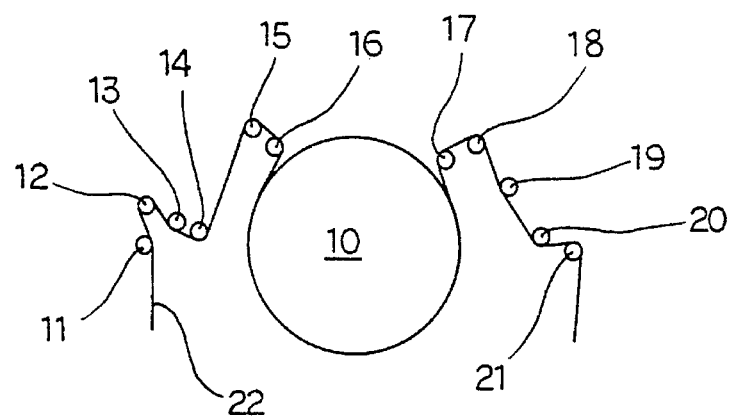
FIG. 5 is a schematical plan view illustrating a tape travelling mechanism according to the present invention.

Arranged around the periphery of the inclined drum 10 is a conveying mechanism for conveying and guiding a tape 22 around the drum 10 including a lever guide roller 12, a first inclined pole 13, a first inclined guide roller 14, a second inclined guide roller 15, a second inclined pole 16, an inclined drum 10, a third inclined pole 17, a third inclined guide roller 18, a fourth inclined pole 19, a capstan shaft 20 and a review arm pole 21, as shown in FIG. 5.

The tension pole 11 and the lever guide roller 12, as shown in FIG. 1 and FIG. 3, are respectively formed on the front end of a tension arm 26 and a guide lever 96 which are provided on the sub-deck 200. As will be explained in greater detail below, during playback, the tension pole 11 is positioned outside of the tape 22 released from a supply reel 110 so as to urge against the exterior side of the tape 22. The first inclined pole 13 and the first inclined guide roller 14 are fixedly disposed on a base 23 which is provided on the main deck 100, so as to guide the tape 22 in an inclined manner such that the tape is disposed at a predetermined angle, as illustrated in FIG. 2.

Further, as shown in FIGS. 1–3, the second inclined guide roller 15 and the second inclined pole 16 are formed on a pole base 24, and the third inclined pole 17 and the third inclined guide roller 18 are formed on a pole base 24a. The pole bases 24 and 24a are guided along each loading groove 55 provided in the main deck 100, as explained below. The tape 22, which is guided around the inclined poles and rollers, is wound around a take-up reel via the fourth inclined pole 19, the capstan shaft 20 and the review arm pole 21, the inclined pole 19 and the capstan shaft 20 being formed on a capstan base 25.

Hereinafter, the main deck 100 and the sub-deck 200 will be explained, with reference to FIGS. 2 and 3. As noted above and as shown in FIG. 2, the inclined drum 10 is forwardly mounted on an upper middle portion of the main deck 100 and has an inclined angle of ten degrees. Guide rails 51 and 52, each having a loading groove 55, are respectively provided on opposite sides of the drum to allow pole bases 24 and 24a disposed on the sub-deck 200 to be retracted downwardly to retrieve the tape, as described in detail below. Stoppers 54, each having a V-shaped groove 53, are provided at upper portions of the left and right upper guide rails 51 and 52 to retain the pole bases 24 and 24a in an appropriate playback position. Also, a secondary slot 56 is formed at the upper one side of the loading slot 55 of the left upper guide rail 51, the purpose of which is explained below.

Further, a loading motor 30 and power transferring device driven by the loading motor 30 are provided on the main deck 100 for driving the various tape drive mechanisms. For driving the tape, a capstan motor 40 is provided on the main deck 100 at a position to the right side of the drum 10, as illustrated in FIG. 2. Also provided on the main deck are a cam lever 39 actuated by a first cam gear 33 of the power transferring device, a plate slider 27 and a sub-deck moving cam lever 28 actuated by a second cam gear 35, and a cam lever 29 actuated by a third cam gear 38.

In more detail, in order to transfer the driving force of the loading motor, the power transferring device has a driving gear 31, a first gear 32, a first cam gear 33, a second gear 34, a second cam gear 35, a third gear 36, a fourth gear 37 and a third cam gear 38 which are engaged with each other in the stated order.

The first cam gear 33 is provided with a cam slot 33a thereon which is guidably fitted with a guide pin 39a of the cam lever 39 pivotally attached at a predetermined position on the bottom of the main deck 100. The second gear 34 is provided with mode switches for controlling each mode signal, so that the deck may be successively operated for each mode.

Further, the second cam gear 35 has a first cam slot 35a and a second cam slot 35b therein. The plate slider 27 is engaged in the second cam slot 35b so as to be moveable upwardly and downwardly and the sub-deck actuating cam lever 28 is engaged with the first cam slot 35a so as to be guided thereby. The third cam gear 38 has a third cam slot 38a therein. A downwardly projected guiding pin 29a of the cam lever 29 is guidably inserted into the third cam slot 38a. The cam lever 29 is provided with a guiding part 29b and a long slot 29c and is pivotably attached at a predetermined position on the main deck 100 so as to be pivoted and guided about a hinge part 29d. The capstan motor 40 is provided with a capstan base 25 thereon having an inclined face 44 which guides a review arm 111, as will be described below.

A driving mechanism is provided on the main deck 100 for pivoting an idler roller 89 from the supply reel 110 to the take-up reel 120 provided on the sub deck. Specifically, a gear 41 is engaged with the capstan motor 40 and an idler operating pulley 43 is connected to the gear 41 via a belt 42. Once the idler roller is pivoted to contact the appropriate reel, that reel is then driven by rotation of the idler roller driven by the capstan motor 40, as discussed in greater detail below.

FIG. 3 illustrates the sub-deck 200 which will now be described. A pair of lower guide rails 57 each having a loading slot 55 are respectively contacted with the upper left and right guide rails 51 and 52 of the main deck and a pair of loading arms 61 are pivotally attached to the bottom of the sub-deck 200. A pair of loading arm assemblies 60 and 60a, which are guided along the loading slots 55 of the upper and lower guide rails 50 and 57, are respectively connected to pole bases 24 and 24a.

A supply reel 110 and a take-up reel 120 are mounted on both sides of the sub-deck 200. A braking device is provided on a side of each of the supply reel 110 and the take-up reel 120 to brake the reels 110 and 120, as shown in FIG. 3. The braking device for the supply reel 110 includes a lever brake 71 which is driven by the contact of a protrusion 35c of the cam gear 35 of the main deck, and an arm brake 72 which brakes or releases the supply reel 110 according to the operation of the lever brake 71.

In more detail, the lever brake 71 is pivotally attached to the upper face of the sub-deck 200 and is provided at one end thereof with a downwardly bent contact part 73 which may be contacted by the protrusion 35c of the second cam gear 35. The opposite end of the lever brake 71 pushes against a protrusion 75 of the arm brake 72 by virtue of a resilient member 74. The arm brake 72 is pivotally attached to the sub-deck on one side of the lever brake 71 and is provided with a braking portion 76 for frictionally braking the supply reel 110, and a protrusion 75 against which the rear portion of the lever brake 71 is pressed. A spring-like member 77 is provided at the hinged portion of the arm brake 72 to urge the braking portion toward the supply reel. As explained below in greater detail, a braking force is applied to the supply reel 110 by rotating the lever brake counter-clockwise until the left end thereof (FIG. 3) disengages the protrusion 75 such that the braking portion 76 of the arm brake 72 contacts the supply reel.

The braking device for the take-up real 120 includes an arm brake 81 which is rotated when contacted by a cam surface 29e of the cam lever 29, (FIG. 6c) and an arm clutch 82 which brakes or releases the take-up reel 120 according to the operation of the arm brake 81.

Referring to FIG. 3, the arm brake 81 is pivotally attached to the sub-deck 200 and urged in the counter-clockwise direction by spring 83. The arm brake 81 includes a protrusion 84 at the bottom thereof which contacts the cam surface 29e of the cam lever 29.

Further, the arm clutch 82 includes a lever 85 having a circular arc face which is designed to abut against the braking face of the take-up reel 120, and an arm bracket 87 having a braking portion 86 which is engaged with a lower geared part of the take-up reel 120. The arm bracket 87 and the lever 85 are biased away from each other by a resilient member 88 in order to prevent the take-up reel 120 from being rotated in a reverse direction.

On the other hand, as noted above, an idler 89 is disposed between the supply reel 110 and the take-up reel 120 to selectively transmit the driving force of the capstan motor 40 to the reels 110 and 120.

A slider 91 is movably provided at a predetermined position on the sub-deck 200 for actuating a guide lever 96. Specifically, a guide pin 97 of the lever 96 is guided along a cam slot 92 of the slider 91. The guide lever 96, which is provided at one end thereof with the lever guide roller 12, and the tension arm 26, which is provided at one end thereof with the tension pole 26, are mounted so as to pivot about a common axis. The tension arm 26 is connected to a spring 26a and is also connected to a tension band 98 which is wound around the supply reel 110.

Further, referring to FIG. 3, a pinch roller lever 101 is provided with a guide pin 102 which is guided along the guide part 29b of the cam lever 29 on the main deck 100. A pinch arm 106 is provided with a rotatable pinch roller 105 and a contact part 108 which is contacted by a review arm 111. The pinch roller lever 101 is provided at one end thereof with spring-like member 103 and is connected to the pinch arm 106 by another spring-like member 107. Further, the review arm 111 is elastically mounted by a spring-like member 114 on the sub-deck 200 and includes a review arm pole 21, a contact protrusion 112 at the bottom thereof, and a contact part 113.

Figure 4:
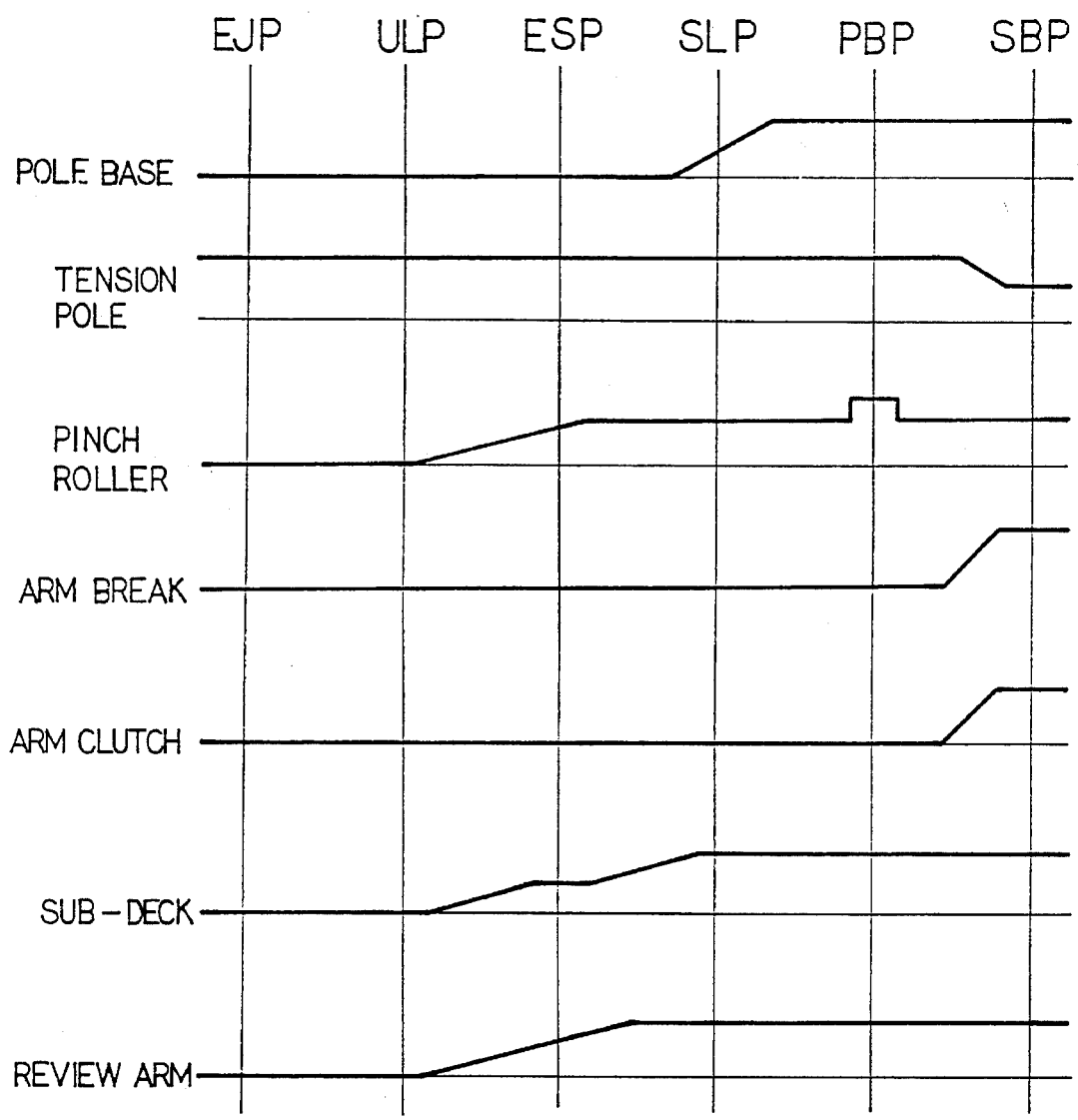
FIG. 4 is a timing chart illustrating the operating states according to the present invention.

Now, the operation of the present invention will be described for each position with reference to FIG. 4.

first, an ejecting step is carried out to move the sub-deck 200 backwardly on the main deck 100 to an ejecting position EJP, so that the housing is opened to allow a tape to be ejected.

The unloading stop position ULP is a condition just prior to loading the tape, in which the housing is locked after insertion of the cassette therein and the loading motor is slightly rotated.

The end sensor position ESP, which exists only momentarily, is a position where the tape is rewound toward the take-up reel for tape-loading, and in which the guide lever 96, the pinch roller 105 and the review arm 11 begin moving together with the sub-deck 20 in preparation for loading the tape.

Figure 6A:
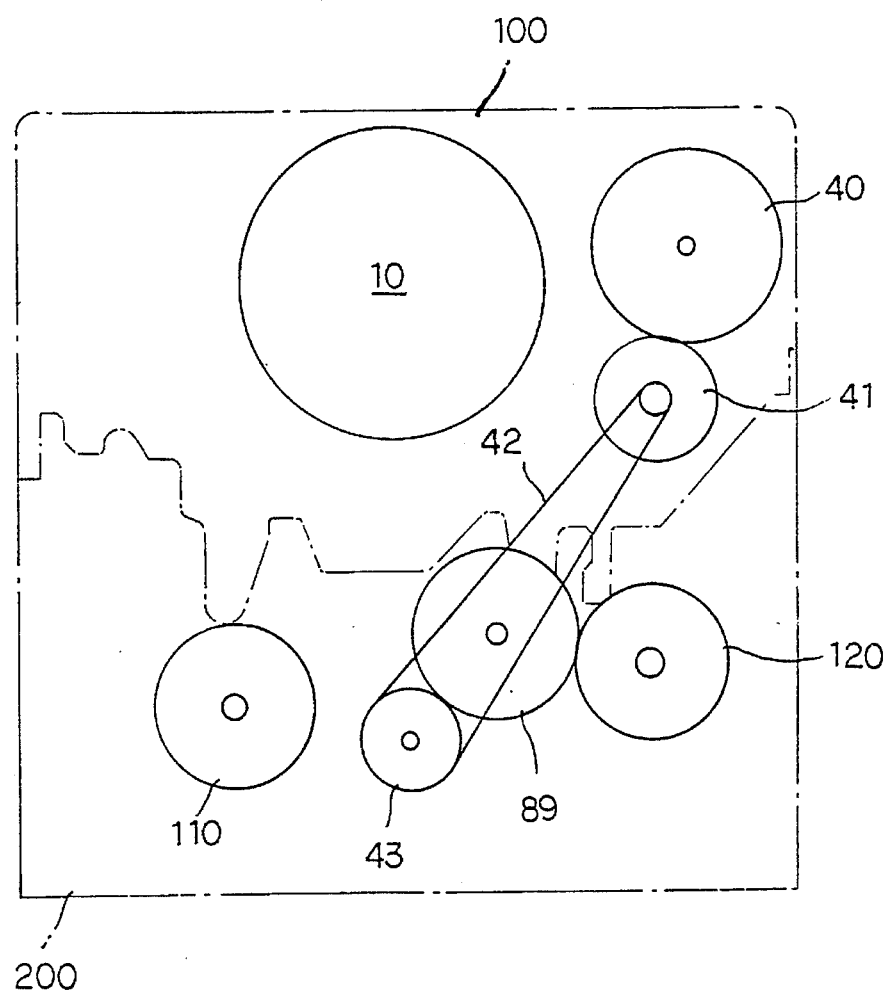

In more detail, in this end sensor position, the idler 89 is positioned so that it contacts the supply reel and driven to rewind the tape onto the supply reel, if necessary. As noted above, the position of the idler 89 may be changed as desired by controlling the rotational direction of the capstan motor 40. That is, as shown in FIGS. 2 and 6A, the gear 41 engaged with the capstan motor 40 is rotated. Rotation of gear 41 is transmitted to the idler 89 through the belt 42, so that the idler 89 may be alternatively positioned in engagement with the supply reel 110 or the take-up reel 120. However, as noted above, the idler roller is engaged with the supply reel as necessary to rewind the tape onto the supply reel to assume the end sensor position.

The guide level 96, the pinch roller 105 and the review arm 111 are moved along with the movement of the sub-deck 200. First, the movement of the sub-deck 200 will be described as follows.

Figure 6B:
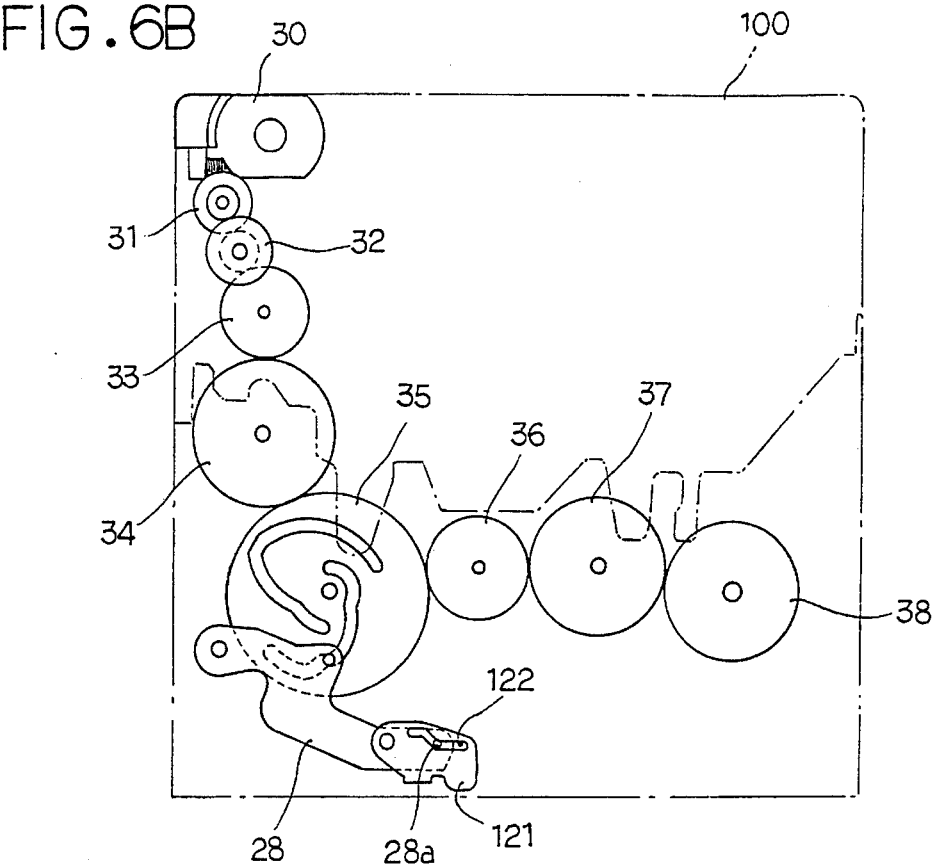

As shown in FIG. 2 and FIG. 6B, when the loading motor 30 is actuated, reduced rotating power thereof is sequentially transmitted to driving gear 31, first gear 32, first cam gear 33, second gear 34, second cam gear 35, third gear 36, fourth gear 37 and third cam gear 38, to thereby rotate each of these gears.

One end of the sub-deck 200 is secured to the main deck 100 in such a manner as to be movable in response to rotation of the cam gear 35, and the cam lever 28 for guiding the sub-deck transmitting guiding part 121. In particular, rotation of cam gear 35 causes the cam lever 28 to pivot due to the engagement of the cam pin in the second cam slot 35a. Protrusion 28a of cam lever 28 is slidably disposed in guide slot 122 of the sub-deck transmitting guiding part 121. Thus, the rotation of the cam lever 28 causes the sub-deck 200, secured to the protrusion 28a via the guiding part 121, to move with respect to the main deck.

Figure 6C:
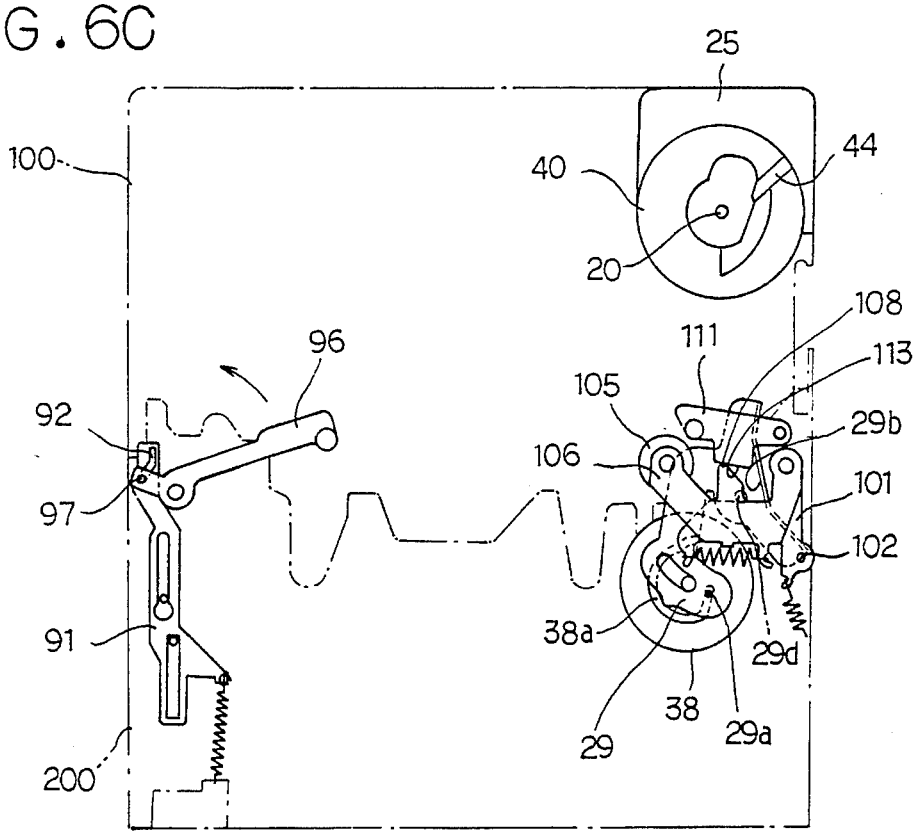

As shown in FIG. 6C, the guide lever 96 is disposed on the upper face of the sub-deck 200, and a guide pin 97 of the guide lever 96 is inserted into the cam slot 92 of the slider 91, so that the guide lever 96 is pivoted in a counter-clockwise direction to an opened position.

The pinch roller 105 is engaged with the capstan shaft 20 in response to rotation of third cam gear 38. Specifically, in response to rotation of the third cam gear 38, the pinch roller 105 is operated in such a manner that, as shown in FIG. 6C, the guide pin 102 of the pinch roller lever 101 disposed on the sub-deck 200 is guided by the guiding part 29b of the cam slot 29 disposed on the main deck 100. As a result, the pinch roller lever 101 is rotated to an upper position.

A pinch arm 106, disposed on the same hinge part as the pinch roller lever 101, is rotated upwardly upon rotation of pinch roller 101, and the pinch roller 105, disposed on the pinch arm 106, is contacted with the capstan shaft 20 according to the subsequent movement of the sub-deck 200.

A review arm 111 is operated in such a manner that, as shown in FIG. 6C, when the pinch arm 106 is rotated, the contacting part 108 of the pinch arm 106 pushes against the contacting part 113 of the review arm 111, so that the review arm 111 is rotated. The review arm 111, pivotally disposed on the sub-deck 200, is guided to contact the inclined face 44 of the capstan base 25 of the capstan motor 40 (FIG. 2). Movement of the review arm is designed to properly position the review arm pole 21 attached thereto.

A sub-loading position SLP is a position to which the sub-deck 200 is moved so that the lower guide rails of the sub-deck 200 are substantially aligned with the upper guide rails of the main deck 100 and the pole bases 24 and 24a are partially loaded.

The sub-loading position is divided into two positions. A first sub-loading position is carried out by moving the sub-deck 200 with respect to the main deck so that pole bases 24 and 24a are in an initial loading position, and a second sub-loading position where the pole bases 24 and 24a may be completely loaded by moving the slide plate 27, as described below.

The loading of pole bases is now explained hereinafter with reference to FIG. 6D.

The power of loading motor 30 is sequentially transmitted to driving gear 31, first gear 32, first cam gear 33, second gear 34 and second cam gear 35, according to which the sliding part 61b of both loading arms 61 is moved with respect to the main deck to the first sub-loading position in accordance with movement of the subdeck. In particular, the sub-deck 200 is moved downwardly by means of the cam lever 28, guided by the first cam slot 35a of the second cam gear 35, until the sliding parts 61b of the loading arms 61 respectively engage the pins 125 of levers 124. Rotation of the second cam gear 35 also causes the plate slider 27, slidably attached to the main deck, to move upwardly so that both loading arms 61, provided with a central hinge part 61a which is hinge-fixed to the lower side of the sub-deck 200, to be inwardly rotated, in the manner illustrated in FIG. 6D. Accordingly, pole bases 24 and 24a, linked to the front part of both loading arms 61, are loaded according to the rotation of both loading arms 61.

The playback position PBP is carried out to reproduce the picture by loading the tape around the inclined drum.

The playback position will be explained from the start of loading of the pole bases 24 and 24a in the condition where the sub-deck 200 and the main deck 100 are arranged such that the upper and the lower guide rails 50 and 57 are disposed such that the loading slots 55 of the sub-deck and the main deck are aligned.

Figure 6D:
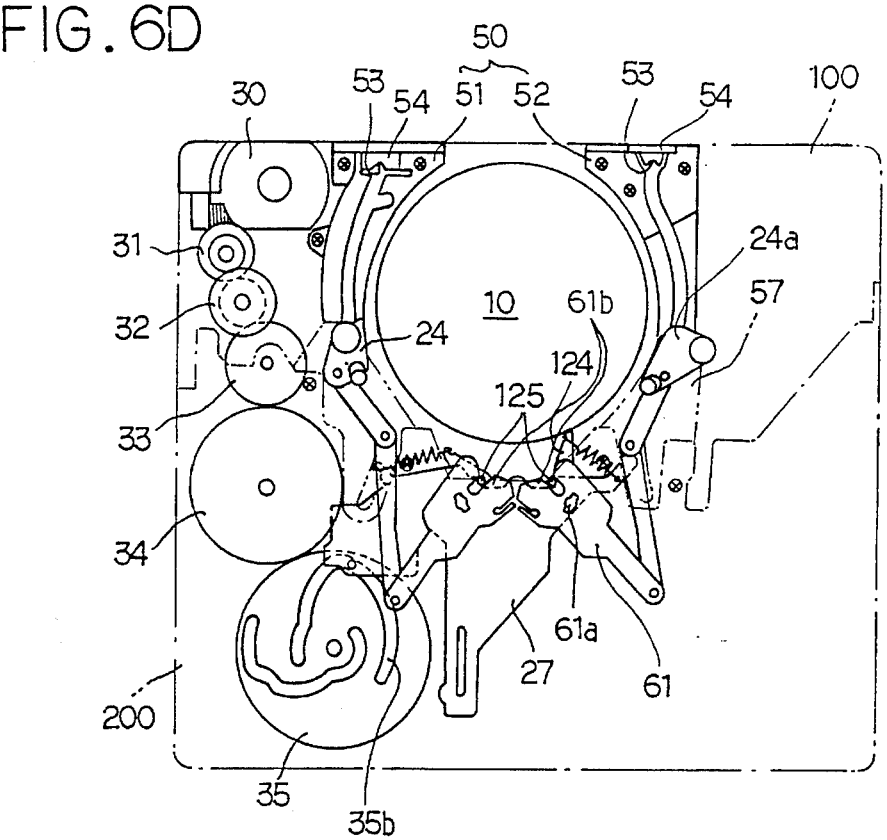

As explained above, the pole bases 24 and 24a are loaded in the position illustrated in FIG. 6D in response to the sliding movement of the plate slider 27 by means of the second cam gear 35. In this position, the pole bases 24 and 24a are received in the loading slot 55 of the right and left upper guide rails 51 and 52.

As noted above, secondary slot 56 is formed at a predetermined position of loading slot 55 of the left upper guide rail 51, so that the lower guide part of the pole base 24 is inserted into the secondary slot 56 while being moved along the loading slot 55 and the pole base 24 is stopped after being rotated with a predetermined angle in the counterclockwise direction.

Since the pole base 24 is rotated in the counterclockwise direction, the tape 22, guided by the second inclined pole 16 on the pole base 24, firmly contacts the periphery of drum 10. The final movement of the pole bases 24 and 24a is stopped by the stoppers 54, provided with the V-groove 53, of the right and left upper guide rail 51 and 52, and at this condition the tape is reproduced.

On the other hand, as shown in FIG. 1 and FIG. 5, since the tension arm 26 having a tension pole 11 thereon is positioned on the outside of the tape in the unloading stop position ULP and end sensor position ESP, the tension pole 11 of the tension arm 26 presses against the outside of the tape to thereby apply tension to the tape due to contacting force of the tension band 98.

In this playback position PBP, the tape 22, wound on the supply reel 110, must be conveyed so as to be wound on the take-up reel 120 in order to perform recording or reproducing. For this purpose, the tape 22 is sandwiched between the pinch roller 105 and the capstan shaft 20 and conveyed due to the rotational force of the capstan motor 40.

This operation of pressing the pinch roller 105 against the capstan shaft 20 is explained with reference to FIG. 6C hereunder.

The third cam gear 38 is provided with a cam lever 29 having the guiding pin 29a slidably provided in the cam slot 38a. The cam lever 29, having a guiding part 29b at one side thereof, may be pivoted about the hinge part 29d a predetermined angle in response to the rotation of the third cam gear 38.

As noted above, guide pin 102 of the pinch roller lever is guided by the guiding part 29b. Thus, rotation of the cam lever 29 attendantly caused the pinch roller lever 101 and the pinch arm 106 connected thereto to rotate such that the pinch roller 105 is pressed against the capstan shaft 20, as illustrated in FIG. 1.

On the other hand, the stand-by position SBP is designed to stop reproduction of the picture. In this position, the reels 110 and 120 are respectively braked by the arm brake 72 and the arm clutch 82, the pinch roller 105 is separated from the capstan shaft 20 to stop the conveyance of the tape, and the tension pole 11 is loosened to protect the tape in the condition of loading.

Operation of the relevant members in the stand-by position is now explained.

Figure 6E:
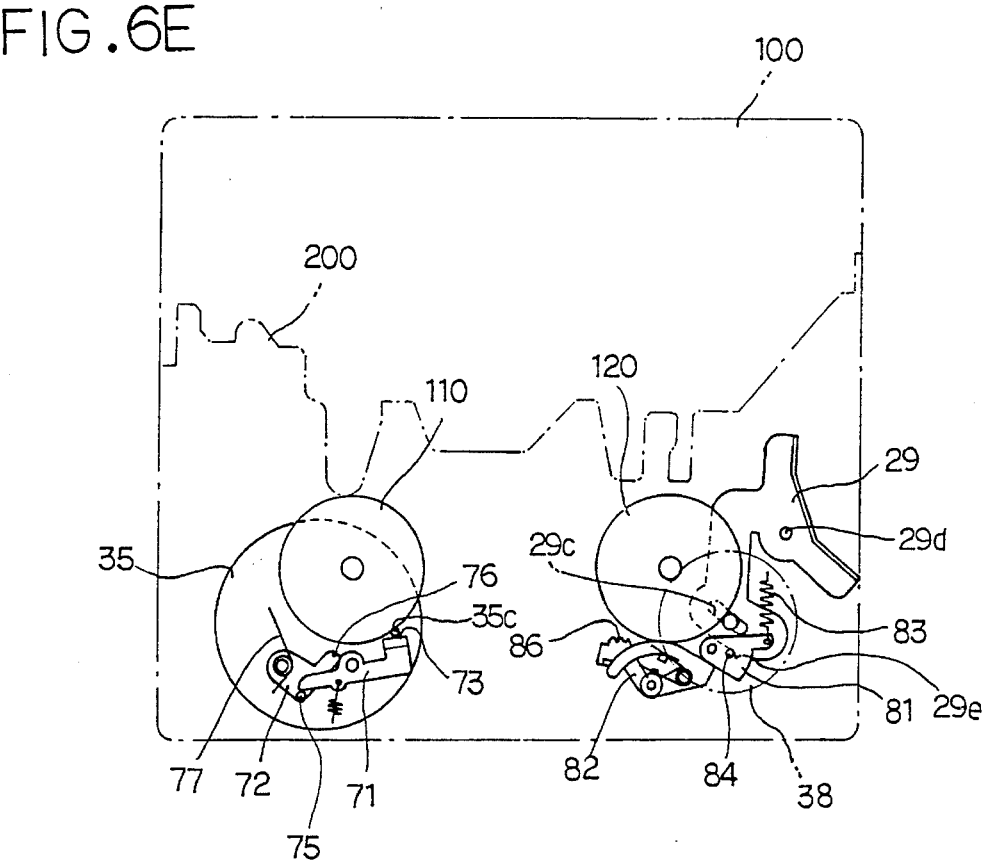

As shown in FIG. 6E, the arm brake 72 is actuated in response to the rotation of the second cam gear 35 rotated by the loading motor 30, so as to prevent the supply reel 110 from rotating. That is, as noted above, a protrusion 35c is formed at a predetermined position on the second cam gear 35. The lever 71, having a contacting part 73 which contacts protrusion 35c, is disposed at a predetermined position with respect to the supply reel 110. The arm brake 72 for controlling the rotation of supply reel 110 by means of the lever brake 71 is disposed on one side of the lever brake.

Accordingly, when the protrusion 35c of the second cam gear 35 is contacts the contacting part 73 upon rotation of the second cam gear 35, the lever brake 71 is rotated a predetermined angle until the protrusion 75 of the arm brake 72 is no longer contacted by the lever brake 71. As a result, the spring force of spring member 77 urges the arm brake against the supply reel 110 to apply a braking force thereto.

As shown in FIGS. 3 and 6E, the arm clutch 82 braking the take-up reel 120 actuates the arm brake 81 by means of the third cam gear 38 rotated by the loading motor 30, according to which the arm clutch 82 is actuated and the braking part 86 of the arm clutch brakes the take-up reel 120.

That is, referring to FIGS. 1, 3 and 6E, if the cam lever 29 disposed on the third cam gear is rotated a predetermined angle about the hinge part 39d within the long slot 29c in response to the rotation of the third cam gear 38, the downward protrusion 84 is guided along the cam surface 29e of the cam lever 29 and the arm brake 81 is rotated.

Rotation of the arm brake 81 pushes the arm clutch 82 disposed at one side of the arm brake 81, whereby the braking part 86 of the arm clutch 82 brakes the take-up reel 120.

The releasing operation of the pinch roller 105 for stopping the conveyance of the tape is explained hereinbelow with reference to FIGS. 1, 3 and 6C.

Due to the shape of the end portion of the cam slot 38a of the third cam gear 38, the cam lever 29 is rotated a predetermined angle in the opposite direction in response to further rotation of the third cam gear 38. As a result, the guide pin 102 of the pinch roller lever 101 disposed along the guiding part 29b also rotates in the opposite direction due to the force of spring-like member 103, resulting in the pinch roller 105 being separated from the capstan shaft 20.

The releasing operation of the tension pole 11 for protecting the tape after loading condition is explained hereinbelow.

Figure 6F:
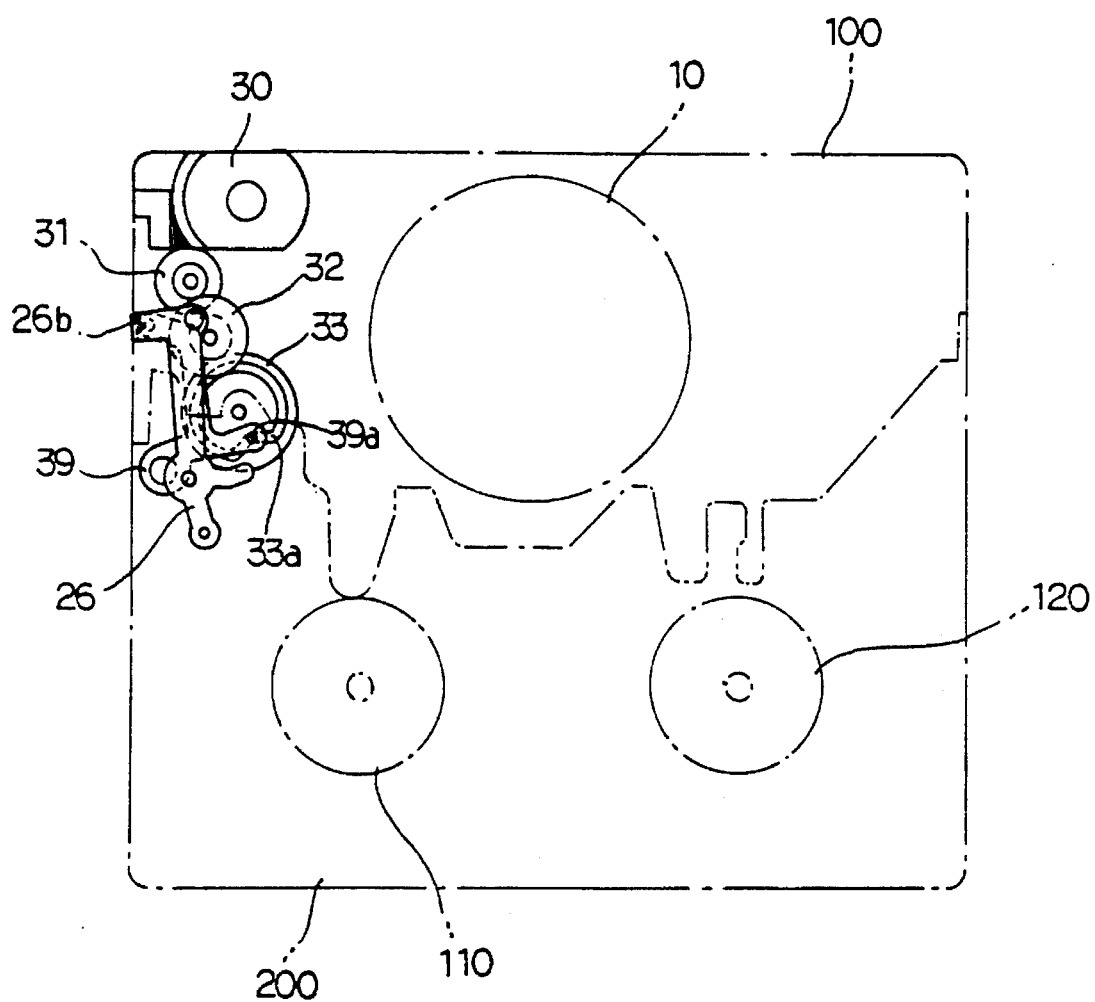

As shown in FIGS. 2 and 6F, a guide pin 39a of the cam lever 39 is inserted into the cam slot 33a of the first cam gear 33 rotated by the rotation of the loading motor 30, so that the cam lever 39 is slightly pivoted from the stand-by position in accordance with the shape of the cam slot 39a.

The rotation of the cam lever 39 causes the cam lever 39 to urge the downwardly bent part 26b of the tension arm 26 outwardly so that the tension arm 26 is pivoted a predetermined angle resulting in the tension pole 11 being displaced to the outside so that the tension pole 11 no longer abuts against periphery of the tape 22.

As stated above, in the camcorder deck driving device, the drum is inclined forwardly on the main deck, and the tension pole is disposed to push the tape from the outside thereof to the inside. Moreover, the structure of each element is simplified including the specific means for applying a braking force to the take-up and supply reels.

Therefore, the present invention has an advantage in that the size of the deck can be considerably minimized. Moreover, since a simplified and standard drum is used, the handling and operation is simple and the production cost can be reduced.

The invention is not limited to the embodiment described hereinabove. Various modifications of disclosed embodiment as well as other embodiments of the invention will readily be apparent to persons skilled in the art upon reference to the above description of the invention. All such modifications and embodiments fall within the true scope of the invention.

What is claimed is:

1. An apparatus for driving a deck of a camcorder, said deck having a main deck and a sub-deck adapted to move on the main deck, the apparatus comprising:

an inclined drum mounted on the main deck;

upper guide rails provided on the main deck at both sides of said drum and having first tape loading slots;

lower guide rails provided on both sides of the sub-deck in correspondence with said upper guide rails when the sub-deck is in a tape loading position, said lower guide rails having second tape loading slots;

pole bases having a left pole base and a right pole base mounted on the sub-deck for loading a tape to said drum, each of said pole bases being moved along said first and second tape loading slots; and means for guiding the tape along a travelling path, wherein said guiding means includes a tension pole, a lever guide roller, a first inclined pole, a first inclined guide roller, a second inclined guide roller, a second inclined pole, said drum, a third inclined pole, a third inclined guide roller, a fourth inclined pole, a capstan shaft, and a review arm pole arranged in the stated order;

wherein said tension pole is provided at a front end of a tension arm to support a drum facing side surface of the tape, said tension arm being provided on the sub-deck; and further wherein said lever guide roller is provided at a front end of a guide lever which is coaxially mounted with said tension arm and pivotal independently of said tension arm.

2. The apparatus as claimed in claim 1, wherein said drum has a diameter of 40 mm and is disposed at an inclined angle of ten degrees with respect to the main deck.

3. The apparatus as claimed in claim 1, wherein said upper guide rails comprise a left upper guide rail and a right upper guide rail, and wherein said apparatus further comprises a pair of stoppers respectively disposed at an end of said first tape loading slots of said upper guide rails to retain said pole bases in a tape playback position.

4. The apparatus as claimed in claim 3, wherein one of said upper guide rails has a secondary slot at one end thereof to rotate a corresponding one of the pole bases as said corresponding pole base is moved to said playback position to thereby tension said tape around said drum.

5. The apparatus of claim 1, wherein said first inclined pole and said first inclined guide roller are provided on a base which is fixedly mounted on the main deck.

6. The apparatus of claim 5, wherein said second inclined guide roller and said second inclined pole are fixedly provided on one of said pole bases, and said third inclined pole and said third inclined guide roller are fixedly provided on another of said pole bases.

7. The apparatus of claim 6, wherein said fourth inclined pole is fixedly provided on a capstan base.

* * * * *